US006676982B2

United States Patent
Mody

(10) Patent No.: US 6,676,982 B2
(45) Date of Patent: Jan. 13, 2004

(54) NUTRITIONAL FOOD BAR FOR SUSTAINED ENERGY

(75) Inventor: Seema K. Mody, Montville, NJ (US)

(73) Assignee: Cadbury Adams USA LLC, Wilmington, DE (US)

( * ) Notice: Subject to any disclaimer, the term of this patent is extended or adjusted under 35 U.S.C. 154(b) by 100 days.

(21) Appl. No.: 09/869,576

(22) Filed: Jun. 26, 2001

(65) Prior Publication Data

US 2002/0168448 A1 Nov. 14, 2002

(51) Int. Cl.⁷ .............. A23L 1/10; A23L 1/302; A23L 1/304
(52) U.S. Cl. .......... 426/93; 426/601; 426/618; 426/620; 426/656; 426/658
(58) Field of Search ............ 426/93, 656, 658, 426/601, 618, 620

(56) References Cited

U.S. PATENT DOCUMENTS

| | | |
|---|---|---|
| 3,431,112 A | 3/1969 | Durst |
| 3,582,336 A | 6/1971 | Rasmusson |
| 3,814,819 A | 6/1974 | Morgan |
| 3,903,308 A | 9/1975 | Ode |
| 3,992,556 A | 11/1976 | Kovacs et al. |
| 4,017,644 A | 4/1977 | Jokay |
| 4,055,669 A | 10/1977 | Kelly et al. |
| 4,152,463 A | 5/1979 | Hayward et al. |
| 4,421,771 A | 12/1983 | Stock et al. |
| 4,451,488 A | 5/1984 | Cook et al. |
| 4,543,262 A | 9/1985 | Michnowski |
| 4,565,702 A | 1/1986 | Morley et al. |
| 4,623,546 A | 11/1986 | Holay et al. |
| 4,671,963 A * | 6/1987 | Germino et al. .............. 426/89 |
| 4,832,971 A | 5/1989 | Michnowski |
| 4,859,475 A | 8/1989 | Michnowski |
| 4,871,557 A | 10/1989 | Linscott |
| 4,888,187 A | 12/1989 | Given, Jr. et al. |
| 5,389,395 A | 2/1995 | Joseph et al. |
| 5,413,805 A | 5/1995 | Delpierre, III et al. |
| 5,612,074 A | 3/1997 | Leach |
| 5,902,797 A | 5/1999 | Bell et al. |
| 5,968,896 A | 10/1999 | Bell et al. |
| 6,207,207 B1 * | 3/2001 | Belzowski et al. ......... 426/303 |

FOREIGN PATENT DOCUMENTS

| | | |
|---|---|---|
| EP | 0178074 | 4/1986 |
| EP | 0348196 | 12/1989 |
| EP | 0234792 | 8/1991 |
| WO | 8704602 | 8/1987 |

* cited by examiner

*Primary Examiner*—Helen Pratt
(74) *Attorney, Agent, or Firm*—Watov & Kipnes, P.C.

(57) ABSTRACT

A nutritional food bar for providing sustained energy to the consumer is provided. The bar has a core, a coating, and comprises a mixture of vitamins, minerals, proteins, carbohydrates and fats. The core is a non-baked grain-based core comprised of at least one extruded rice crisp and at least one toasted puffed rice crisp. The coating is a confectioner's coating which is selected from chocolate and compound coatings.

6 Claims, No Drawings

NUTRITIONAL FOOD BAR FOR SUSTAINED ENERGY

BACKGROUND OF THE INVENTION

1. Field of the Invention

The present invention generally relates to the field of food composition, and more particularly relates to grain-based food bars of the type that are fortified with advantageous nutrients, and may be prepared without baking or cooking.

2. Description of the Prior Art

Proteins, fats and carbohydrates in the human body provide energy to maintain vital bodily functions. It is known that all three nutrients, after digestion, may be converted into glucose to be used to provide energy together with a feeling of satiety. A meal of protein and/or fat alone would however convert so slowly that there would be no notable rise in glucose level. A meal of pure carbohydrate would convert so quickly with a resultant sharp peak in blood glucose but lasting for only a short duration. Balancing fat, carbohydrate and protein in a meal therefore is necessary to even out and prolong the elevation in blood glucose to provide more sustained energy. It is also known that several vitamins and minerals, including vitamin B6, B12, and chromium, are necessary for the proper functioning of metabolic pathways that lead to sustained energy levels.

Non-cooked food bars have been known and available for some time. A non-cooked bar is substantially non-perishable, readily portable and rapidly consumed. In order to help meet nutritional needs, fortified non-cooked bars were introduced which provided a portion of the daily requirement of minerals and vitamins (Recommended Daily Allowances, RDA) as described by the USFD. These fortified bars also incorporated carbohydrates, proteins and fats in amounts determined by the use of the bars either as a complete meal, a meal supplement, or as a snack. Carbohydrates were often selected to yield an energy boost and various specialty components were included to meet a wide variety of special interests.

U.S. Pat. No. 4,055,669 teaches a breakfast food bar using crushed dry cereal. U.S. Pat. No. 4,451,488 teaches a granola food bar which combines the textural ingredients with a polyhydric alcohol binder. U.S. Pat. Nos. 4,543,262, 4,832,971 and 4,859,475 teach fortified food bars having high protein and low or no lactose wherein a confectioner's coating is distributed uniformly throughout the core. U.S. Pat. No. 4,871,557 teaches a granola food bar having high dietary fiber in the form of compressed flakes. U.S. Pat. No. 5,612,074 teaches a fortified food bar having dietary fiber and non-animal sourced protein. EP 0 178 074 teaches a multi-textured food product such as a granola bar having a thermoplastic binder matrix containing non-soluble food components dispersed throughout. WO 87/04602 teaches a low calorie fortified food bar having non-fibrous indigestible carbohydrate. The above references are incorporated herein by reference.

Many of the available non-cooked food bars however, lack taste and textural appeal for the consumer seeking taste satisfaction with good nutrition.

Candy bars, composed mainly of chocolate and other sweet additives, have often been used by consumers as sources of energy. These bars by definition are a tasty and appealing sweet treat. These products however, are often high in fat content especially saturated fats, e.g., a typical 50 gram candy bar contains about 13 grams of total fat, including about 6 grams of saturated fat. Further, the typical candy bar contains about 30 grams of simple sugars, the energy boost therefore being of the quick burst type which is followed by a drop in energy. These bars are not considered as providing adequate nutrition, having too low a protein content, typically less than 3%, and lacking any appreciable amounts of vitamins and minerals.

Consumers have often expressed an interest in balanced nutritional bars which can provide a more sustained energy, one which lasts between regular meals over periods of one to two hours, and which avoids the energy drop associated with the quick energy provided by candy bars. While consumers are concerned about health many are unwilling to sacrifice taste to achieve good health. There exists therefore a need in the art for a food bar which has the taste, texture, and appeal of a good tasting candy bar but which is more nutritious than a candy bar. There exists a need in the art for a food bar capable of supplying nutrients and sustained energy while providing a desirable good taste.

It is an object of the present invention to provide a nutritional food bar having a blend of proteins, carbohydrates, fats, vitamins and minerals, which can provide sustained energy to the consumer, and yet which has the attractive taste and chew texture associated with a candy bar.

SUMMARY OF THE INVENTION

The present invention is a nutritional food bar for providing sustained energy to the consumer, said bar having a core and a coating, wherein said bar comprises a mixture of vitamins, minerals, proteins, carbohydrates and fats, wherein said core is a non-baked grain-based core comprised of at least one extruded rice crisp and and at least one toasted puffed rice crisp and said coating is a confectioner's coating which is selected from chocolate and compound coatings.

DETAILED DESCRIPTION OF THE INVENTION

The term "nutrition" means the process by which humans obtain energy in the form of food for growth, maintenance and repair. The term "food" refers to any material containing nutrients such as carbohydrates, proteins, and fats which are required by humans in order to obtain energy and grow. A "non-baked food bar" is a food in bar form prepared by blending a mixture of ingredients usually with a binder, in a size for quick consumption. The ingredients are selected such that baking or cooking of the ingredients is not required. The term "sustained energy" is defined as a lack of hunger or a feeling of fullness (satiety) particularly for a time of up to two hours. The term "dietary fiber" means the indigenous components of plant materials in the diet which are resistant to digestion by enzymes produced by humans, i.e., the sum of all polysaccharides and lignin that are not digested by the secretions of the human digestive tract. The term "rice crisp" means a rice-based piece having a light crisp and crunchy texture. The term "carbohydrate" includes simple (mono and disaccharides) and complex (polysaccharides) carbohydrates. The term "compound coating" defines a confectioner's coating based upon a hardened vegetable oil (fat) wherein the principle ingredients are sugar and fat. A "chocolate coating" is a confectioner's coating based on cocoa butter.

The present invention provides for a non-cooked, ready to eat, grain-based food bar which contains proteins, vitamins, minerals, carbohydrates, both simple and complex (grains) including a blend of soluble and insoluble dietary fibers, and fats which is formulated to provide a sustained energy to the consumer. For example, the product is preferably formulated to give about 16–24 vitamins and minerals in particular the B6, B12 vitamins, fat at a level that is less than that found in a candy bar, particularly significantly less saturated fat, proteins at a level higher than that found in a candy bar and carbohydrates which are more complex than that found in a candy bar. The product is formulated to include low glycemic sources of carbohydrates which can improve glucose control to help sustain energy levels. The product in particular includes fructose which has been shown to diminish food intake and reduce gastric emptying. The bar also contains levels of fiber and protein which help lower the glycemic level, and fat at levels which help reduce gastric emptying and blunt any sharp rises in glucose levels.

The present invention also provides for a good tasting food bar, one having the appealing taste of a confectionery coated sweet and/or chocolate candy bar with a crisp, crunchy core, providing both smooth and crisp organoleptic impressions.

The protein content of the bar may come from one or more sources and, based on the weight of the total bar, should be about 5–25% by weight. Carbohydrates from sources including dietary fiber and fructose should constitute about 45–85% by weight. Fat should constitute from about 8–20% by weight. The vitamins and minerals include all of the B vitamins needed for energy metabolism. The vitamins and minerals do not add significantly to the total weight of the bar.

The bar provides nutritional balance having a caloric balance of about 5–25% from protein, about 45–85% from carbohydrate and about 16–40% from fat, the total adding to 100% of the calories. The bar has from about 100–300 calories, preferably from about 150–250 calories. A serving is one or more bars having a total weight of approximately 45–55 g. By "bar" is meant the core (or center) and the coating. It is preferred to provide the total serving in one bar although more than one bar may constitute the total serving.

Protein may be sourced from but not limited to soy, wheat, corn, pea, egg, and milk (whey, casein and caseinate) protein; gelatin, and nuts such as peanuts, almonds and soynuts. The protein may be added as an ingredient per se, such as, for example, a whey protein isolate, or may be sourced from other ingredients such as from example, peanut pieces, or may be a mixture of both.

The term "carbohydrate" includes simple (mono and disaccharides) and complex (polysaccharides) carbohydrates. Simple carbohydrates are selected from but not limited to high fructose corn syrup, high maltose corn syrup, rice syrup, sucrose, fructose, maltodextrin, lactose, glucose, dextrose and maltose. Complex carbohydrates are provided by but not limited to sources as cereal grains such as wheat, oat, corn, barley, rice, rye, sorghum; legumes both mature and dry, such as soybeans; and nuts such as peanuts, and the like. Cereal grains may also act as sources of fiber, may be rolled, toasted, extruded and otherwise treated to add to the chew texture.

The carbohydrates can be in the form of grains, flakes, flours and meals. Simple carbohydrates including fructose should constitute from about 30–60% of the carbohydrates. Complex carbohydrates should constitute from about 40–70% of the carbohydrates. The blend of carbohydrates including fibers is selected to add to sustained energy.

Dietary fiber can be divided into two broad categories: insoluble dietary fiber and water soluble dietary fiber. Best suited are cereal brans and mixtures thereof due to their relatively high insoluble dietary fiber content. Those cereal brans useful in this invention are selected from the group consisting of rice, wheat, corn, barley, rye, oats, pea and mixtures thereof. Wheat, oat and corn bran are the most preferred. The components of the insoluble dietary fiber derived from these cereal brans are known to be cellulose, hemicellulose and lignin.

The soluble dietary fibers may be film-forming hydrocolloid materials such as alginates, gums, pectin, mucillages and similar plant exudates. Examples of useful soluble fibers are arabic, tragacanth, karaya, ghatti, seaweed extracts including agar, alginates, carrageenans, and furcellan; pectin; and mucellages such as psyllium. Dietary fiber should constitute about 2–15% of the carbohydrates. The ratio of insoluble to soluble fiber can range from 50:50 to about 99:1 with ratios in the range of about 80:20 to about 99:1 preferred. The blend of higher insoluble to soluble also adds to the improved taste characteristics of the food bar.

It is an object of the present invention is to provide not simply a nutritious food bar but to provide a superior tasting nutritious food bar. Key to the superior taste character, mouthfeel and organoleptic acceptability of the food bar is the use of a particular combination of ingredients which generally fall into the category of the above discussed cereal grains. That combination of ingredients includes the blend of at least one rice crisp selected from the group of toasted puffed rice and at least one rice crisp selected from the group of extruded rice. The use of two different versions of rice crisps provides a desirable crisp chew character or crunch character to the product. Toasted puffed rice crisp are typically made from whole kernel or broken pieces of whole kernels of rice. The process involves mixing kernels with a flavor solution (e.g. sugar, malt syrup, salt, water) and optional vitamin mixes, then cooking, drying, cooling and tempering, and toasting the crisp. Toasted puffed rice crisp are supplied by Kellogg and Weetabix among others. Extruded rice crisp are typically made from rice flour or milled rice, with whole kernels or parts of kernels also optionally used. The process involves cooking the rice product with water, a flavor material (e.g., starches, sugar, corn sweeteners, malt, salt), and optional vitamin mixes in a cooking extruder or cooking section of a cooking expanding extruder. Extruded rice crisp are supplied by Pacific Grain and Ringger Foods among others. These two rice crisps components are suitably used in ratios of from about 80:20 to about 40:60 with ratios of about 70:30 to about 50:50 preferred, in amounts of from about 10–30% by weight of the food bar with amounts of about 15–25% preferred. These components contribute to the carbohydrate, including fiber, content of the food bar.

Fat used in the food bar of the present invention includes one or more sources of fat, including but not limited to, dairy sources such as butter, butter oil, dried milk/cream powder and vegetable sources such as coconut, palm kernel, palm, cottonseed, canola, rapeseed, corn, soybean, sesame seed, safflower, and olive oils, which can be used per se or may be partially hydrogenated. Fat can be short, medium or long chain triglycerides.

The vitamins and minerals may be coated or uncoated. Vitamins include A, B-complex (B1 (thiamine), B2 (riboflavin), B5 (calcium pentothenate), niacin, B6, B12), C, D, E, K, folic acid, biotin, and the like. Minerals and trace elements include iron, magnesium, phosphorous, potassium, calcium, iodine, zinc, copper, manganese, chromium, selenium, molybdenum and the like.

The superior chew character of the bar is further enhanced by the preferred addition of the a portion of the above nutritional components in the form texture additives. These additives are used in addition to the named rice crisp component. Texture additives are those ingredients which have a particular associated mouthfeel and include but are not limited to dried fruit pieces, nuts, caramel layering, nougat layering, wafers, cookie pieces, fruit preparations and the like.

The core of the food bar is enrobed in a confectioner's coating which is a compound coating or a chocolate coating. The use of a confectioner's coating on the core adds to the sweet, candy bar-like appeal of the food bar. Compound coatings may be unflavored or flavored with chocolate, vanilla, peanut, coconut, yogurt, fruit flavors and the like. The principal ingredients are the fat and sugar. The fat or partially hydrogenated vegetable oil, may be selected from cottonseed, coconut, soybean, palm kernel, palm, peanut and the like oils. The amount of coating applied to the core typically constitutes about 10 to 40% by weight of the weight of the bar wherein the core constitutes the remaining 90 to 60% by weight. Chocolate coatings include cocoa butter and may be white or dark or milk chocolate.

In addition to the above nutritional components, the food bar may contain other food product ingredients such as emulsifiers, flavorants, high intensity sweeteners and the like.

Emulsifers may be added for stability of the product. Emusifiers include lecithin, polyglycerol esters, sorbitan, fatty acid esters, mono- and di-glycerides, and the like. Lecithin is a preferred emusifier.

Flavorants can be used in both the coating and the core of the bar. Flavorants are used in the form of synthetic flavor oils and flavoring aromatics, and/or oils, oleo resins and extracts derived from plants, leaves, flowers, fruits and so forth, and combinations thereof. Non-limiting representative flavor agents include flavor oils such as spearmint, cinnamon, oil of wintergreen (methyl salicylate), peppermint (menthol), clove, bay, anise, eucalyptus, thyme, cedar leaf, oil of nutmeg, allspice, oil of sage, mace, oil of bitter almonds, and cassia oil; artificial, natural and synthetic fruit flavors such as vanilla; citrus oils including lemon, orange, lime, grapefruit; and fruit essences including apple, pear, peach, banana, grape, strawberry, raspberry, cherry, plum, pineapple, apricot and so forth; chocolate flavorings, peanut butter flavoring, rum, butterscotch, toffee, cocoa, coconut, carob, honey, pecan, pistashio, almond, butter, yogurt, and the like. Generally any flavoring or food additive such as those described in Chemicals Used in Food Processing, publication 1274, pages 63–258, by the National Academy of Sciences, may be used.

The bar may include high intensity sweeteners such as saccharin, cyclamates, aspartame, acesulfame-K, and the like; and humectants such as glycerin, sorbitol, xylitol, fructose, dextrose, propylene glycol and other polyols. Other common ingredients such as colorants, preservatives/antioxidants, may be added. The amount of ingredients incidental to the sustained energy/nutrition objects of the food bar may vary depending on the formulation, end use and consumer preferences.

The following table provides general use ranges for ingredients which are preferably used in the practice of the present invention to provide the desired nutritional blend. Percent weight is by weight of the bar.

TABLE 1

| INGREDIENT | Percent Weight Range |
| --- | --- |
| Core | 60–90 |
| Binder:* | 15–40 |
| Other Ingredients: | 40–80 |
| Cereal Grains** | 10–40 |
| Bran(fiber) | 1–10 |
| Fructose | 2–8 |
| Protein*** | 4–20 |
| Vitamin/Mineral Mix | 0.05–5 |
| Flavoring | 0.0–3 |
| Textured Additives | 0.0–30 |
| Coating****: | 10–40 |

*corn syrups, optional sugars, hydrogenated vegetable oil, humectant and emulsifier
**including the rice crisps
***added as such
****contains 25–40% fat.

The bars are manufactured by methods commonly used for non-baked food bars. The process comprises mixing dry ingredients, separately preparing the binder blend (syrup slurry), adding the binder to the dry blend with mixing, heating as necessary to blend the materials, then adding sensitive materials such as flavorants. The bar cores may be formed by conventional methods including extrusion and sheet forming methods. A sheet method is preferred in the practice of the present invention. In extrusion the ingredients are transferred to a conventional confectionery bar extruder having roller bars which force the mixture through a die to form the core which can be cut into appropriate size. In a sheet method the mixed ingredients are formed into sheets through roller presses, cut into ribbons subsequently cut into the appropriate size bar core. Any topping layers are applied to the core prior to coating. The bar core is cooled if necessary and coated (enrobed) with a chocolate or compound coating.

EXAMPLES

The following examples are provided to illustrate the preferred embodiments of the invention.

Example 1

Chocolate Caramel Peanut Crunch

The following provides a chocolate coated bar of the invention which is formulated to provide sustained energy to the consumer. The example also provides the ranges within which additional formulations of the invention may be prepared.

TABLE 2

| INGREDIENT | Percent by weight | Formulation Range |
| --- | --- | --- |
| Core | 80.00 | 70.00–83.00 |
| Binder: | 24.00 | 15.00–30.00 |
| Corn syrup | 11.000 | 5.00–15.00 |
| High fructose corn syrup | 6.500 | 3.00–10.00 |
| Honey | 2.500 | 0.00–15.00 |
| Sugar* | 1.000 | 0.00–5.00 |
| Whey* | 0.900 | 0.00–3.00 |
| Hydrogenated palm kernel oil* | 1.000 | 0.00–4.00 |
| Lecithin (soy)* | 0.100 | 0.00–0.300 |
| Glycerin | 1.000 | 0.00–6.00 |
| Other Ingredients: | 56.00 | 40.00–70.00 |
| Rice crisp** | 17.610 | 10.00–25.00*** |

TABLE 2-continued

| INGREDIENT | Percent by weight | Formulation Range |
|---|---|---|
| Rolled oats | 4.400 | 2.00–10.00 |
| Corn Bran | 2.000 | 1.50–8.00 |
| Whey protein isolate | 5.500 | 4.00–10.00 |
| Fructose | 2.500 | 2.00–8.00 |
| Cocoa powder flavoring | 0.833 | 0.00–3.00 |
| Vitamin/Mineral mixture | 0.157 | 0.05–5.00 |
| Caramel layer | 16.000 | 10.00–25.00 |
| Peanut pieces | 7.000 | 5.00–20.00 |
| Milk Chocolate Coating: | 20.000 | 17.00–30.00 |

*from caramel
**extruded/toasted at 10.7/6.9
***extruded/toasted at 70:30 to 50:50

The binder ingredients were mixed in a kettle and heated to 65° C. The dry ingredients including the rice crisps, were added to a ribbon type blender and mixed for 1 minute. Binder material was then added to the dry mix and again mixed for 1 minute. The mix was fed to a sheet forming line. The peanuts were spread on the formed sheet followed by a layer of caramel deposited on top of the peanut layer. Bars were then formed by cutting, cooled and enrobed with the milk chocolate. Finished bars were cooled before packaging.

The above formula could alternatively be used to provide a bar wherein the total caramel ingredient is blended with the binder or with the core. Alternatively, the peanuts could be added to the dry mix and dispersed throughout the core. Other formulas can be prepared within the indicated ingredient ranges with variations on the presentation of the final product.

The taste character of the Table 2 chocolate caramel-peanut crunch bar was evaluated by an eight member sensory descriptive panel. Flavor/aroma, texture and aftertaste were evaluated. The flavor of the chocolate coated bar was described as being very much like that of a chocolate-caramel-peanut candy bar with just slightly less of a peanut flavor. The texture was found to be chewy with a nice hardness and cohesiveness. The crispness was found to be very close to a crisp rice treat-type product with a persistent crispness which maintained throughout the chew. The bar had a sweet taste attributed to the coating which lingered after consumption of the bar.

Example 2

Yogurt Berry Crunch

The following provides a compound coated bar of the invention which is formulated to provide sustained energy to the consumer. The example also provides the ranges within which additional formulations of the invention may be prepared.

TABLE 3

| INGREDIENT | Percent by weight | Formulation Range |
|---|---|---|
| Core | 80.00 | 70.00–83.00 |
| Binder: | 32.00 | 15.00–40.00 |
| Corn syrup | 14.600 | 10.00–20.00 |
| High fructose corn syrup | 8.667 | 3.00–13.00 |
| Honey | 3.800 | 0.00–15.00 |
| Sugar* | 1.300 | 0.00–5.00 |
| Whey* | 1.200 | 0.00–3.00 |
| Hydrogenated palm kernel oil* | 1.100 | 0.00–4.00 |

TABLE 3-continued

| INGREDIENT | Percent by weight | Formulation Range |
|---|---|---|
| Lecithin (soy)* | 0.100 | 0.00–0.300 |
| Glycerin | 1.333 | 0.00–6.00 |
| Other Ingredients: | 48.00 | 40.00–70.00 |
| Rice crisp** | 22.000 | 13.00–30.00*** |
| Rolled oats | 4.400 | 2.00–10.00 |
| Soy Nuts | 4.540 | 2.00–8.00 |
| Corn Bran | 2.000 | 1.50–8.00 |
| Whey protein isolate | 6.100 | 4.00–10.00 |
| Fructose | 2.500 | 2.00–8.00 |
| Vitamin mix | 0.160 | 0.05–5.00 |
| Diced fruit pieces | 6.000 | 3.00–10.00 |
| Mixed berry flavor | 0.300 | 0.00–0.500 |
| Yogurt Flavored Compound Coating: | 20.000 | 17.00–30.00 |

*from caramel
**extruded/toasted at 13.8/8.2
***extruded/toasted at 70:30 to 50:50

The binder ingredients were mixed in a kettle and heated to 65° C. The dry ingredients were added to a ribbon type blender and mixed for 1 minute. The binder was then added to the dry mix and again mixed for 1 minute. The mix was fed to a bar forming line followed by enrobing with the yogurt coating. Finished bars were cooled before packaging.

The above formula could alternatively be used to provide a bar wherein the total caramel ingredient is blended with the binder or with the core. Alternatively, the diced fruit pieces could be distributed in a layer on the core or a fruit jam or a fruit preparation could be mixed into or layered in or on the core. Other formulas can be prepared within the indicated ingredient ranges with variations on the presentation of the final product.

The taste character of the Table 3 yogurt berry crunch bar was evaluated by an eight member sensory descriptive panel. Flavor/aroma, texture and aftertaste were evaluated. The flavor was described as being that of a blend of berry and dairy with toasted and raw grain impressions. The texture was found to be chewy with a nice hardness and cohesiveness. The crispness was found to be very close to a crisp rice treat-type product with a persistent crispness which maintained throughout the chew. The bar had a sweet taste attributed to the coating which lingered as a sweet yogurt-like taste after consumption of the bar.

I claim:

1. A nutritional food bar for providing sustained energy to the consumer, said bar having a core present at about 60–90% by weight of said bar and a coating present at about 10–40% by weight of said bar, wherein said bar comprises a mixture of vitamins, minerals, proteins at about 5–25% by weight of said bar carbohydrates at about 45–85% by weight of said bar, and fats at about 8–20% by weight of said bar;

wherein said core is a non-baked grain-based mixture comprising a rice crisp component present at about 10–30% by weight of said bar, said component comprised of at least one extruded rice crisp component and at least one toasted rice crisp component in a ratio of about 80:20 to about 40:60 by weight;

and wherein said coating is a confectioner's coating selected from chocolate and compound coatings.

2. The food bar according to claim 1 wherein the rice crisp component is present at about 15–25% by weight of said bar, comprised of at least one extruded rice crisp component and at least one oven toasted puffed rice crisp component in a ratio of about 70:30 to about 50:50 by weight.

3. A nutritional food bar having from about 100–300 calories, comprising vitamins, minerals, proteins, carbohydrates, and fats, said bar having a non-baked, grain-based core at about 60–90% by weight of said bar and a coating at about 10–40% by weight of said bar, wherein said coating is a confectioner's coating containing from about 25–40% fat, and selected from chocolate and compound coatings; and, wherein said core has by weight of said bar from about 15–40% binder comprising corn syrup, 10–40% cereal grains, 1–10% fiber, 4–20% protein, 2–8% fructose, 0.05–5% vitamin and mineral mixture, 0.0–3% flavor, and 0.0%–30% texture additives;

said core including a rice crisp component at about 10–30% by weight of said bar, said component comprised of at least one extruded rice crisp component and at least one toasted puffed rice crisp component in a ratio of about 80:20 to about 40:60 by weight.

4. The food bar according to claim 3 wherein the rice crisp component is present at about 15–25% by weight of said bar, comprised of at least one extruded rice crisp component and at least one oven toasted rice crisp component in ratios of about 70:30 to about 50:50 by weight.

5. A nutritional food bar for providing sustained energy to the consumer, said bar having a core present at about 70–83% by weight of said bar and a coating present at about 17–30% by weight of said bar, wherein said core is a non-baked grain-based mixture of ingredients comprising by weight about 5–15% corn syrup, 3–10% high fructose corn syrup, 0–15% honey, 0–5% sugar, 0–3% whey, 0–4% hydrogenated palm kernel oil, 0–0.3% lecithin, 0–6% glycerin, 2–10% rolled oats, 1.5–8% corn bran, 4–10% whey protein isolate, 2–8% fructose, 0–3% flavoring, 0.05–5% vitamin and mineral mixture, 10–25% caramel, 5–20% peanuts, 10–25% rice crisp comprised of about a 70:30 to about a 50:50 weight ratio of extruded rice crisp to toasted puffed rice crisp;

and wherein said coating is a chocolate coating.

6. A nutritional food bar for providing sustained energy to the consumer, said bar having a core present at about 70–83% by weight of said bar and a coating present at about 17–30% by weight of said bar, wherein said core is a non-baked grain-based mixture of ingredients comprising by weight about 10–20% corn syrup, 3–13% high fructose corn syrup, 0–15% honey, 0–5% sugar, 0–3% whey, 0–4% hydrogenated palm kernel oil, 0–0.3% lecithin, 0–6% glycerin, 2–10% rolled oats, 2–8% soy nuts, 1.5–8% corn bran, 4–10% whey protein isolate, 2–8% fructose, 0–3% flavoring, 0.05–5% vitamin and mineral mixture, 3–10% diced fruit pieces, 13–30% rice crisp comprised of about a 70:30 to about a 50:50 weight ratio of extruded rice crisp to toasted puffed rice crisp;

and wherein said coating is a compound coating.

* * * * *